(12) United States Patent
Yoshikawa

(10) Patent No.: US 8,300,179 B2
(45) Date of Patent: Oct. 30, 2012

(54) FLUORESCENT TUBE, ILLUMINATING APPARATUS FOR DISPLAY DEVICE, AND DISPLAY DEVICE

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 385 days.

(21) Appl. No.: 12/675,529

(22) PCT Filed: May 2, 2008

(86) PCT No.: PCT/JP2008/058401
§ 371 (c)(1),
(2), (4) Date: Feb. 26, 2010

(87) PCT Pub. No.: WO2009/031337
PCT Pub. Date: Mar. 12, 2009

(65) Prior Publication Data
US 2010/0214512 A1 Aug. 26, 2010

(30) Foreign Application Priority Data

Sep. 7, 2007 (JP) ................................. 2007-232868

(51) Int. Cl.
| | |
|---|---|
| *G02F 1/1335* | (2006.01) |
| *H01K 1/04* | (2006.01) |
| *H01J 29/82* | (2006.01) |
| *H01J 17/04* | (2012.01) |

(52) U.S. Cl. ................ 349/70; 349/61; 349/69; 349/71; 313/445; 313/446; 313/491; 313/631

(58) Field of Classification Search .. 49/65; 349/61–65, 349/69–71; 313/243, 244, 252, 264, 283, 313/291, 326, 331, 335, 339, 343, 346 R, 313/346 DC, 347, 350, 351, 356, 357, 445–458, 313/493, 631, 394

See application file for complete search history.

(56) References Cited

U.S. PATENT DOCUMENTS

2003/0062822 A1* 4/2003 Chow et al. ................... 313/493
(Continued)

FOREIGN PATENT DOCUMENTS

CN 1653584 A 8/2005
(Continued)

OTHER PUBLICATIONS

International Search Report for PCT/JP2008/058401, mailed Jun. 3, 2008.

*Primary Examiner* — Hoan C Nguyen

(74) *Attorney, Agent, or Firm* — Nixon & Vanderhye P.C.

(57) ABSTRACT

A fluorescent tube 30 of the present invention includes a glass tube 31 and electrodes 32 opposed to each other on both end portions 31a of the glass tube 31, characterized in that the electrode 32 has a closed-end hollow shape opened on the opposite side from the end portion 31a of the glass tube 31, and the electrode 32 constituting the closed-end hollow shape has an inner surface 35 configured to be tapered toward the end portion 31a of the glass tube 31. With this configuration, it is possible to contain accelerated electrons not only in the bottom face 33 of the electrode 32 but also in the inner surface 35 of the electrode 32, thereby suppressing sputtering. Consequently, it is possible to increase the life of the fluorescent tube 30.

4 Claims, 6 Drawing Sheets

U.S. PATENT DOCUMENTS

| | | |
|---|---|---|
| 2005/0057143 A1 | 3/2005 | Chow et al. |
| 2005/0077830 A1 | 4/2005 | Yamashita et al. |
| 2008/0143258 A1 | 6/2008 | Yamashita et al. |
| 2008/0192176 A1* | 8/2008 | Aoyama .................. 349/65 |
| 2009/0051260 A1* | 2/2009 | Morioka et al. ............ 313/356 |

FOREIGN PATENT DOCUMENTS

| | | | |
|---|---|---|---|
| JP | 2002042724 A | * | 2/2002 |
| JP | 2004192874 A | * | 7/2004 |
| JP | 2007-506228 | | 3/2007 |
| WO | WO 2004/017360 | | 2/2004 |

* cited by examiner

FLUORESCENT TUBE, ILLUMINATING APPARATUS FOR DISPLAY DEVICE, AND DISPLAY DEVICE

This application is the U.S. national phase of International Application No. PCT/JP2008/058401 filed 2 May 2008, which designated the U.S. and claims priority to Japan Application No. 2007-232868 filed 7 Sep. 2007, the entire contents of each of which are hereby incorporated by reference.

TECHNICAL FIELD

The technology presented herein relates to a fluorescent tube, an illuminating apparatus for a display device, and the display device.

BACKGROUND ART

In the conventional art, fluorescent tubes such as cold cathode tubes are used for a backlight apparatus constituting a liquid crystal display. Generally, a cold cathode tube is configured such that a phosphor is applied to the inner wall of a cylindrical glass tube and inert gas (such as argon) and mercury are contained in the glass tube. Further, a high voltage is applied across electrodes on both end portions of the glass tube to start discharge, and the evaporated mercury is excited by collisions with electrons and the atoms of the filler gas and generates ultraviolet rays. The ultraviolet rays excite the phosphor applied to the inner wall of the glass tube and generate visible radiation typified by white light.

In a cold cathode tube configured thus, the electrodes provided on both end portions may be cylindrical. In this case, when the cold cathode tube is used over an extended period, a sputtering phenomenon occurs on the electrodes, particularly on the edge portions of the cylinder. Thus, mercury in the tube may be taken into a sputtered layer formed by the sputtering, so that the luminous efficiency and life of the cold cathode tube may be reduced.

For example, a technique described in patent document 1 has been known as means for suppressing the sputtering. A cold cathode tube described in patent document 1 is configured such that a cap made of an electrical insulating material having high heat resistance is provided on the end portion of an electrode closest to an ionization region. With this configuration, it is possible to reduce or suppress the occurrence of sputtering on the end, so that the life of the cold cathode tube can be increased.

[Patent Document 1] National Publication of International Patent Application No. 2007-506228

In recent years, the number of cold cathode tubes arranged in a backlight apparatus has been increased in response to the need for larger liquid crystal displays, thereby increasing the cost. Thus, it has been examined that the number of used cold cathode tubes is reduced with a constant luminance by increasing the diameters of the cold cathode tubes. When cylindrical electrodes according to the conventional art are used in a cold cathode tube having a large diameter, the following problems may occur:

For example, when the cylindrical electrode has a diameter as in the conventional art, there is a large gap between a side of a glass tube and the electrode. Thus, accelerated electrons reaching the electrodes are not contained in the cylinder and scatter around the electrode, so that sputtering occurs. Consequently, the life of the cold cathode tube may be reduced.

On the other hand, when the cylindrical electrode is increased in diameter, accelerated electrons intensively collide with the bottom face of the cylinder. Thus, sputtering locally occurs on an electrode material or an emitter material on the bottom face, so that the life of the cold cathode tube may be reduced.

SUMMARY

The technology presented herein has been devised according to the foregoing circumstances. A feature of the present technology is to provide a fluorescent tube which can increase the life of an electrode by suppressing sputtering. Another feature of the present technology is to provide an illuminating apparatus including the fluorescent tube, and a display device.

In order to solve the foregoing problems, a fluorescent tube of the example embodiments presented herein includes a glass tube and electrodes opposed to each other on both end portions of the glass tube, characterized in that the electrode has a closed-end hollow shape opened on the opposite side from the end portion of the glass tube, and the electrode constituting the closed-end hollow shape has the inner surface configured to be tapered toward the end portion of the glass tube.

According to the fluorescent tube configured thus, the electrodes disposed on the end portions of the glass tube constitute closed-end hollow shapes, each having an opening in a so-called conical shape that is tapered toward the end portion of the glass tube. The opening area of the electrode is increased toward the opening of the electrode. With this configuration, it is possible to reduce a gap between the opening of the electrode and a side of the glass tube, so that accelerated electrons can be contained in the inner surface of the electrode. Consequently, on the side and so on of the glass tube, it is possible to suppress sputtering caused by accelerated electrons scattering around the electrodes, thereby increasing the life of the fluorescent tube. Further, according to the present embodiment, the opening area is not simply increased and the inner surface of the electrode constituting the closed-end hollow shape has a so-called conical shape. Thus accelerated electrons can be widely collided with not only the bottom face of the electrode but also to the conical inner surface. Consequently, it is possible to suppress local sputtering on the bottom face of the electrode, thereby increasing the life of the fluorescent tube.

DESCRIPTION OF SYMBOLS

Best Mode

Referring to FIGS. 1 to 5, an embodiment will be described below. In the present embodiment, a liquid crystal display 10 will be illustrated as a display device.

Figure 1:
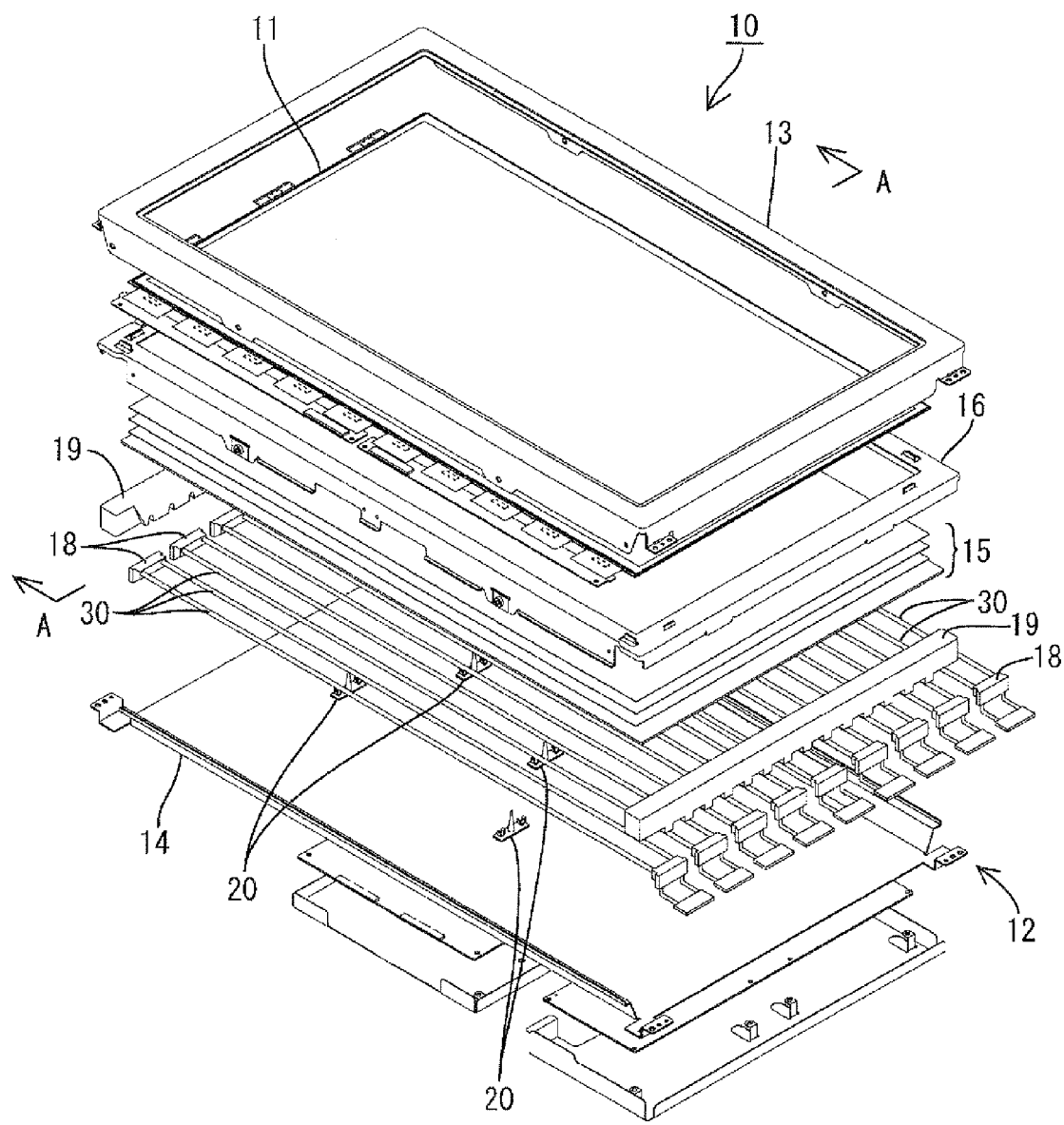
FIG. 1 is an exploded perspective view schematically showing the configuration of a liquid crystal display according to an embodiment.
Figure 2:
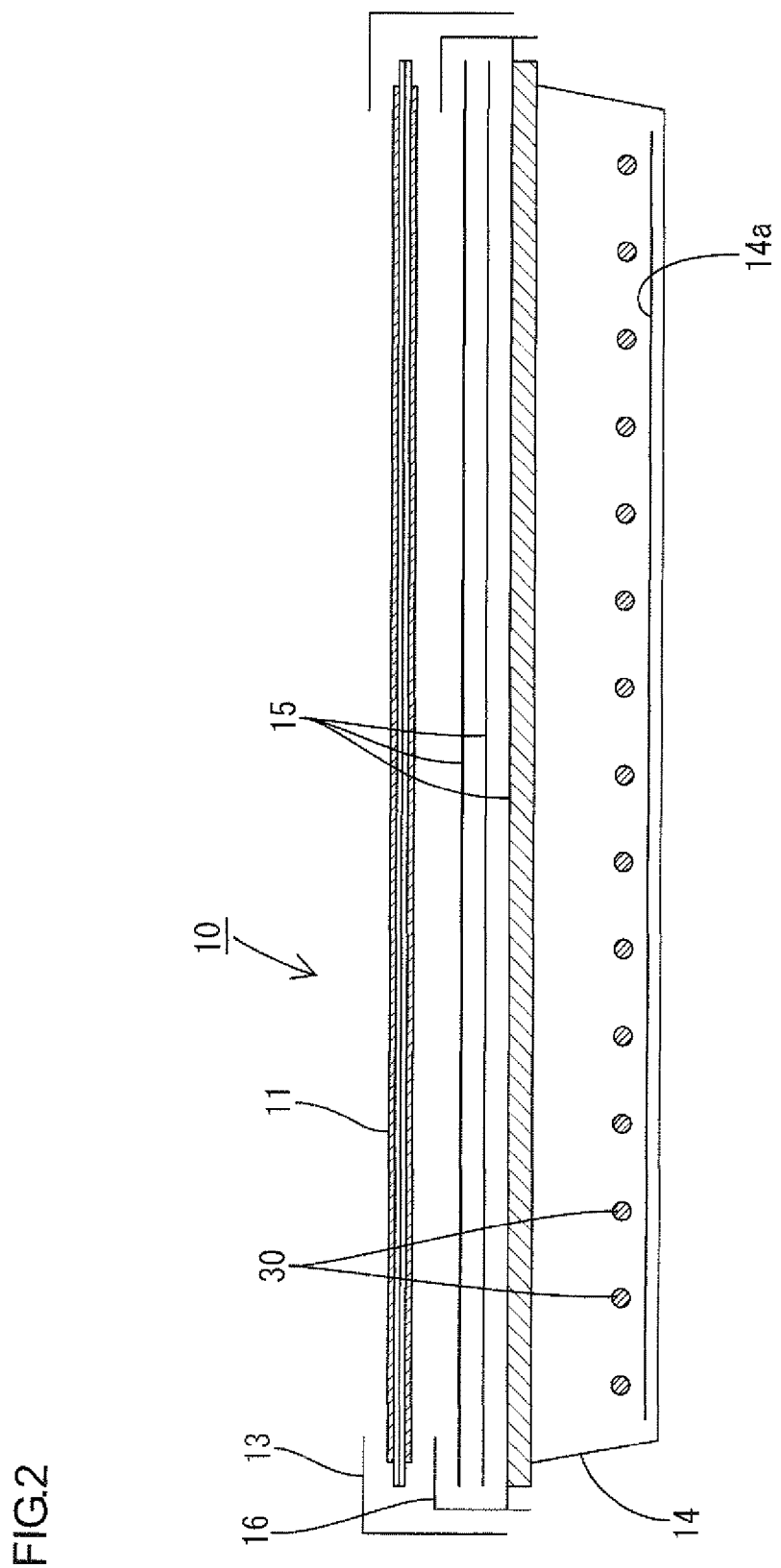
FIG. 2 is an A-A sectional view of the liquid crystal display of FIG. 1.
Figure 3:
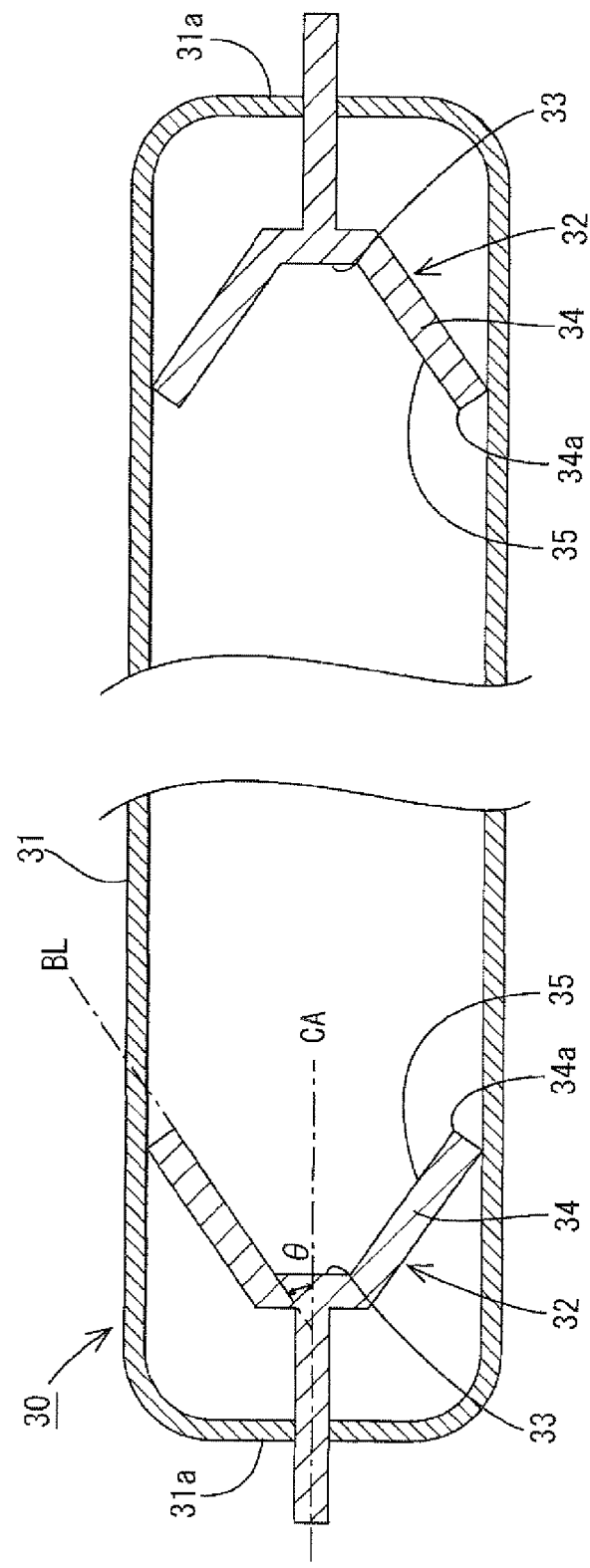
FIG. 3 is a sectional view showing the configuration of a cold cathode tube included in the liquid crystal display.
Figure 4:
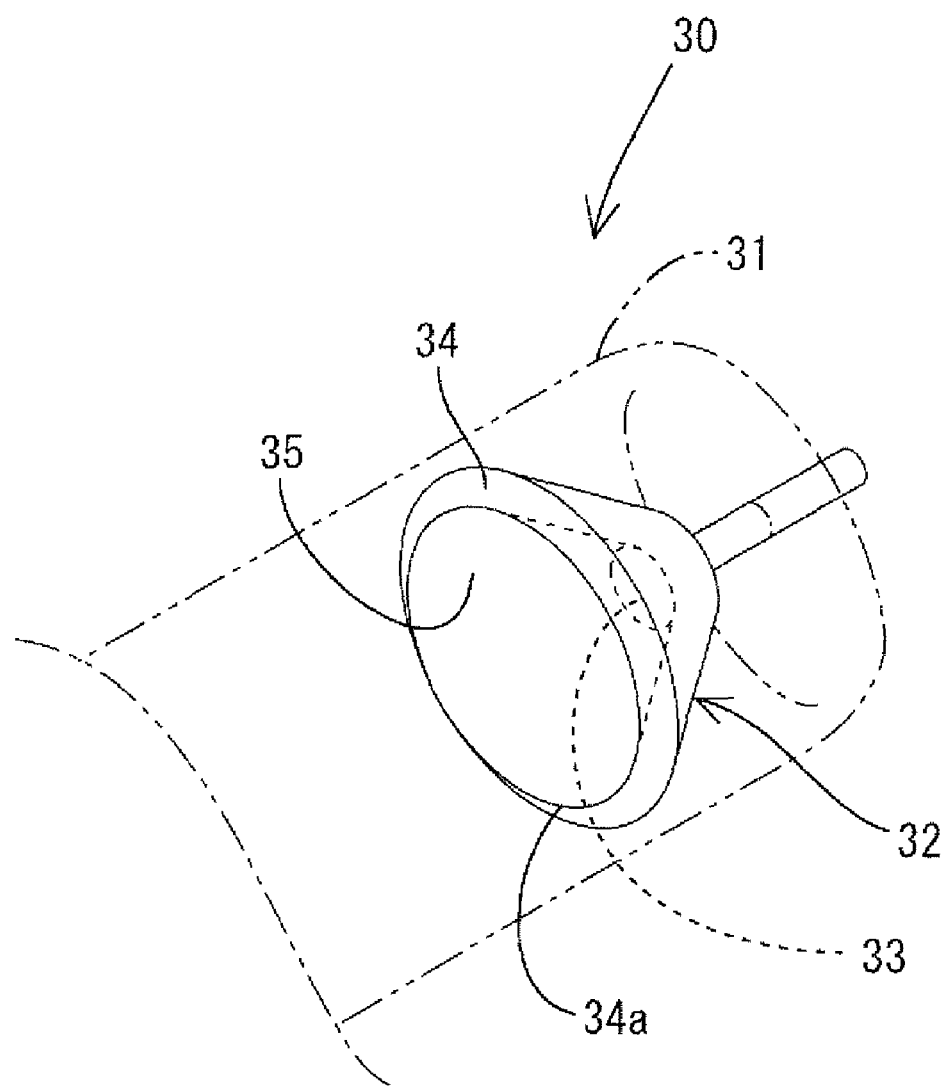
FIG. 4 is a sectional view showing the configuration of an electrode included in the cold cathode tube of FIG. 3.
Figure 5:
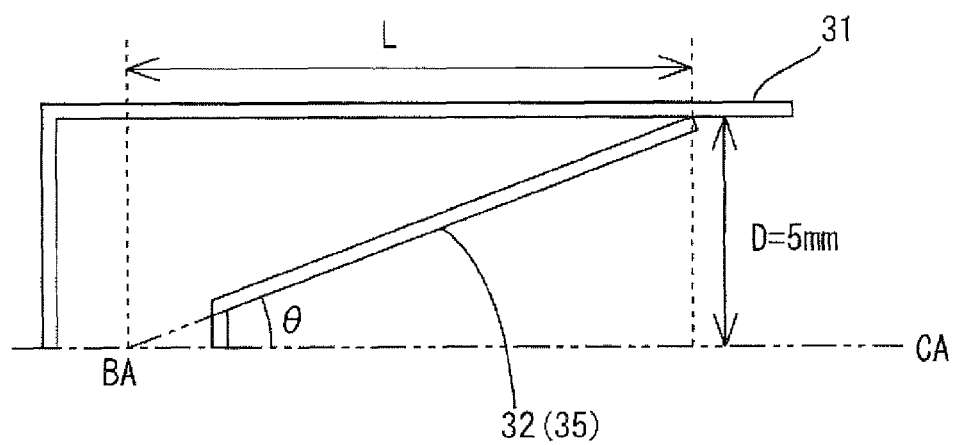
FIG. 5 is a schematic diagram for explaining the relationship between an angle formed by the central axis of the electrode and the generatrix of the inner surface of the electrode and an electrode length.

FIG. 1 is an exploded perspective view schematically showing the configuration of the liquid crystal display of the present embodiment. FIG. 2 is an A-A sectional view of the liquid crystal display of FIG. 1. FIG. 3 is a sectional view showing the configuration of a cold cathode tube included in the liquid crystal display. FIG. 4 is a sectional view showing the configuration of an electrode included in the cold cathode tube of FIG. 3. FIG. 5 is a schematic diagram for explaining the relationship between an angle formed by the central axis of the electrode and the generatrix of the inner surface of the electrode and an electrode length.

First, the following will describe the overall configuration of the liquid crystal display (display device) 10 according to the present embodiment (see FIGS. 1 and 2). The liquid crystal display 10 includes a rectangular liquid crystal panel 11 and a backlight apparatus (an illuminating apparatus for a display device) 12 acting as an external light source. The liquid crystal panel 11 and the backlight apparatus 12 are integrally held by a bezel 13 and so on. In this configuration, the liquid crystal panel 11 is configured such that a pair of glass substrates are bonded to each other with a predetermined gap and a liquid crystal is applied between the glass substrates. One of the glass substrates has switching elements (e.g., TFTs) connected to source lines and gate lines which intersect each other, and pixel electrodes and the like which are connected to the switching elements. The other glass substrate has a color filter and the like on which counter electrodes and colored portions of R, G, B, and so on are arranged in a predetermined array.

The backlight apparatus 12 will be described below. The backlight apparatus 12 is a so-called direct-type backlight apparatus in which a plurality of fluorescent tubes (cold cathode tubes 30 are used in this configuration) are provided immediately under the panel surface (display surface) of the liquid crystal panel 11 along the panel surface.

The backlight apparatus 12 includes a chassis substantially shaped like a box with the top face opened, a plurality of optical members 15 (a diffusing plate, a diffusing sheet, a lens sheet, and a reflective polarizing plate from below in FIG. 1) attached so as to cover the opening of the chassis 14, and a frame 16 for holding the optical members 15 on the chassis 14. Moreover, the chassis 14 includes cold cathode tubes 30, rubber holders 18 for holding both end portions of the cold cathode tubes 30, lamp holders 19 for collectively covering the cold cathode tubes 30 and the holders 18, and lamp clips 20 (not shown in FIG. 2) for attaching the cold cathode tubes 30 to the chassis 14. In the backlight apparatus 12, a side from the cold cathode tubes 30 to the optical members 15 will serves as a light outgoing side.

Further, on the inner surface side (light source side) of the chassis 14, a light reflecting surface is formed by a light reflection sheet 14a as shown in FIG. 2. The chassis 14 including the light reflection sheet 14a can reflect light outgoing from the cold cathode tubes 30, to the optical members 15 such as a diffusing plate. The light reflection sheet 14a can be made up of, for example, a resin sheet and the like having light reflecting properties.

The cold cathode tube 30 is shaped like a long tube. A large number of (eighteen in FIG. 1) cold cathode tubes 30 are stored in the chassis 14 in a state in which the longitudinal directions (axial directions) of the cold cathode tubes 30 are aligned with the long side direction of the chassis 14. As shown in FIGS. 3 and 4, the cold cathode tube 30 is made up of a cylindrical glass tube 31 and electrodes 32 inserted into end portions 31a of the glass tube 31. The glass tube 31 has a diameter of 10 mm, which is larger than the 1 mm to 5 mm diameter of a glass tube used for a cold cathode tube of the conventional art. The glass tube 31 contains mixed gas of neon and argon and mercury, and a phosphor film is formed as a coating on the inner wall surface (side wall) of the glass tube 31.

The electrode 32 is configured to have a closed-end hollow part which is made up of a circular bottom portion (bottom face) 33 and a cup portion 34 rising from the outer periphery of the bottom portion 33. An inner surface 35 of the cup portion 34 is configured to have a so-called conical shape gradually decreasing in diameter toward the bottom portion 33 of the electrode 32, that is, toward the end portion 31a of the glass tube 31. In the present embodiment, an angle θ of 35° is formed by a central axis CA of the electrode 32 (that is a straight line connecting the center of the bottom portion 33 and the center of an opening 34a of the cup portion 34) and a generatrix BL of the inner surface 35. The angle θ can be designed in a range from 20° to 45°.

In the cold cathode tube 30 configured thus according to the present embodiment, the electrodes 32, each of which has a closed-end hollow shape (cup shape) opened to the opposite side from the end portion 31a of the glass tube 31, are disposed on the end portions 31a of the glass tube 31. The inner surface 35 of the electrode 32 constituting the closed-end hollow shape is configured to be tapered toward the end portion 31a of the glass tube 31.

With this configuration, the opening area of the electrode 32 is increased toward the opening 34a (the opposite side from the end portion 31a of the glass tube 31). Thus it is possible to reduce a gap between the electrode 32 and a side of the glass tube 31 and contain accelerated electrons in the inner surface 35 of the cup portion 34 of the electrode 32. Consequently, on the side and so on of the glass tube 31, it is possible to suppress sputtering caused by accelerated electrons scattering around the electrodes 32, thereby increasing the life of the cold cathode tube 30.

Further, the inner surface 35 of the cup portion 34 of the electrode 32 has a so-called conical shape which is tapered toward the end portion 31a of the glass tube 31. Thus accelerated electrons can be widely collided with not only the bottom portion 33 of the electrode 32 but also to the inner surface 35 of the electrode 32. Consequently, it is possible to suppress local sputtering on the bottom portion 33 of the electrode 32, thereby increasing the life of the cold cathode tube 30.

Moreover, in the present embodiment, the angle θ of 20° to 45° is formed by the central axis CA connecting the center of the bottom portion 33 of the electrode 32 and the center of the opening 34a of the cup portion 34 and the generatrix BL of the inner surface 35 of the electrode 32, thereby suppressing local sputtering caused by accelerated electrons on the electrodes 32 while keeping a high luminance.

Table 1 shows evaluation results on the lighting time (life) of the cold cathode tube 30 when the angle θ formed by the central axis CA of the electrode 32 and the generatrix BL of the inner surface 35 of the electrode 32 had various values. In the evaluation tests on the lighting time of the cold cathode tube, the used cold cathode tube included a cylindrical glass tube which had a diameter of 10 ram and a length of 300 mm and contained mixed gas of neon and argon as filler gas and mercury with a gas pressure of 90 torr. Further, a current of 7 mA was applied to the cold cathode tube to conduct an overcurrent acceleration test, and a point when a rise in discharge voltage had been confirmed in the cold cathode tube was regarded as the limit of the lighting time.

Moreover, the electrodes were designed such that the angle θ formed by the central axis of the electrode and the generatrix of the inner surface of the electrode was 0°, 10°, 20°, 35°, 45°, and 80° in the evaluations. θ=0° means that the opening of the electrode was not tapered toward the end portion of the glass tube, that is, the electrode had a true cylindrical shape.

TABLE 1

|  | θ (°) | Lighting time evaluation | Electrode length L (one side, mm) |
| --- | --- | --- | --- |
| Example 1 | 20 | Excellent | 14 |
| Example 2 | 35 | Excellent | 7 |
| Example 3 | 45 | Excellent | 5 |
| Comparative example 1 | 10 | Good | 28 |
| Comparative example 2 | 80 | Good | 1 |
| Comparative example 3 | 0 | Fair | — |

In the lighting time evaluations of Table 1, "Excellent" means that a discharge voltage did not increase over a lighting time of 1000 hours or more, "Good" means that a rise in discharge voltage was confirmed between 100 hours to 1000 hours, and "Fair" means that a rise in discharge voltage was confirmed in a lighting time of less than 100 hours.

Further, as shown in FIG. 5, an electrode length L indicates a length L of the electrode 32. The length L is determined by changing the angle θ when the tip of the electrode 32 is configured to come into contact with the side of the glass tube 31 in the glass tube 31 having a diameter of 10 mm (that is, radius D=5 mm). In the cold cathode tube, a light emitting surface is formed between the electrodes disposed on the end portions of the glass tube. Thus, the luminous region of the cold cathode tube is made up of a region corresponding to a length obtained by subtracting a value twice the electrode length L from the overall length of the glass tube.

As proved in the results of Table 1, by setting the angle θ at 20° to 45° which was formed by the central axis CA of the electrode 32 and the generatrix BL of the inner surface 35 of the electrode 32, a discharge voltage did not increase and a stable luminance could be kept even after a lapse of 1000 hours or more. Thus, it was found that the setting is effective means for increasing the life of the cold cathode tube 30.

On the other hand, in the case of θ=10°, a rise in discharge voltage was confirmed before a lapse of 1000 hours. Moreover, the electrode length L had an extremely large value, so that the area of the light emitting surface of the cold cathode tube decreased and the average luminance of the cold cathode tube also decreased. In the case of θ=80', a rise in discharge voltage was confirmed after a lapse of 100 hours. Presumably this is because sputtering locally occurred due to accelerated electrons intensively colliding with the bottom portion of the electrode.

In the case of θ=0°, a rise in discharge voltage was confirmed after a lapse of several tens hours since lighting, and portions turned black around the electrodes in the glass tube were confirmed by the naked eye. Presumably this is because a gap between the side of the glass tube and the electrode was so large that accelerated electrons reaching the electrode were not fully contained in the cylindrical electrode, scattered around the electrode, and caused sputtering.

<Other Embodiments>

The above explanation described an embodiment. The present technology is not limited to the embodiment illustrated in the foregoing description and drawings. For example, the following embodiments also fall within the technical scope of the present technology.

Figure 6:
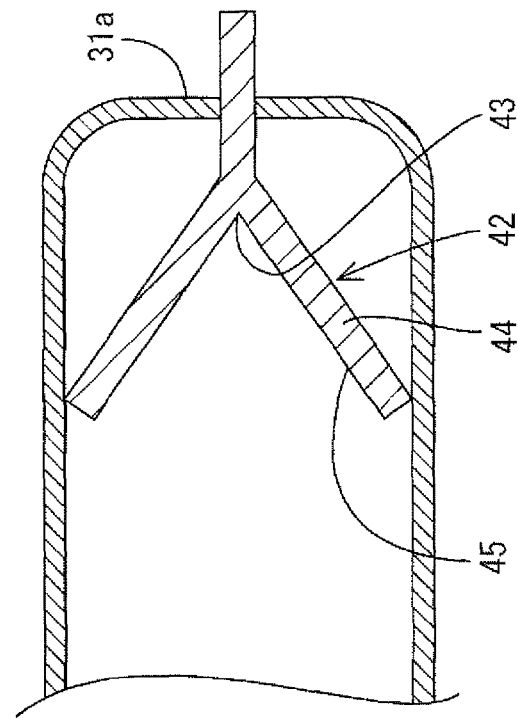
FIG. 6 is a sectional view showing a variation of the cold cathode tube of the present embodiment.
Figure 6:
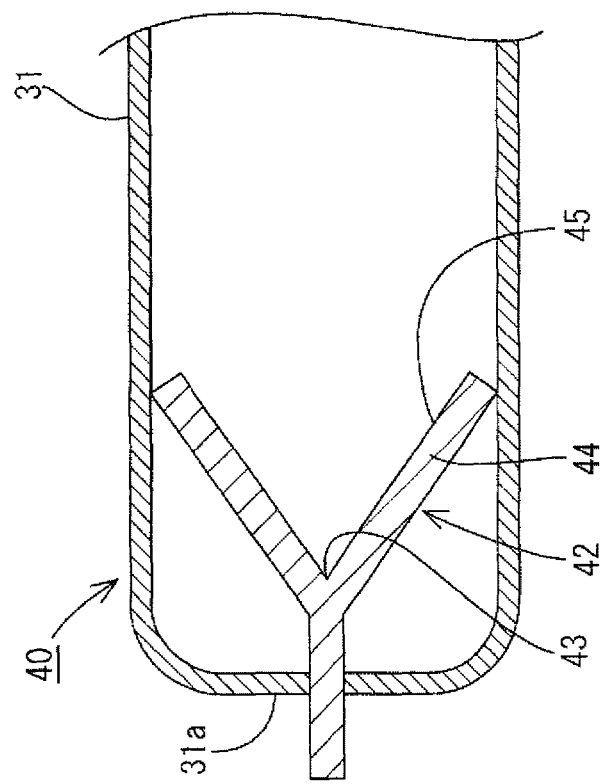

(1) The foregoing embodiment illustrated the cold cathode tube 30 in which the inner surface 35 of the electrode 32 is shaped like a cup, that is, substantially trapezoidal in vertical section. For example, as shown in FIG. 6, a cold cathode tube 40 may be provided in which an electrode 42 has a point-like bottom portion 43. In this case, an inner surface 45 of the electrode 42 is substantially V-shaped in vertical section and a cup portion 44 of the electrode 42 is conical in shape.

(2) The foregoing embodiment illustrated the cold cathode tube 30 using the glass tube 31 larger in diameter than in the conventional art. The diameter of the glass tube is not limited and the present invention is applicable to cold cathode tubes of any size. However, it is expected that the electrode of the present technology is configured to fully exert the effect when the electrode is applied to a cold cathode tube having a large diameter.

(3) The foregoing embodiment illustrated the liquid crystal display using the liquid crystal panel as a display panel. The present embodiment is also applicable to display devices using other kinds of display panel.

The invention claimed is:

1. A fluorescent tube comprising a glass tube and electrodes opposed to each other on both end portions of the glass tube, wherein
    the electrode has a closed-end hollow shape opened on an opposite side from the end portion of the glass tube, and the electrode constituting the closed-end hollow shape has an inner surface configured to be tapered toward the end portion of the glass tube, wherein
    an angle of 20° to 45° is formed by a central axis of the electrode and a generatrix of the inner surface of the electrode, the central axis connecting a center of a bottom face of the electrode constituting the closed-end hollow shape and a center of an opening of the electrode, and wherein
    a tip of the electrode is in contact with a side of the glass tube.

2. An illuminating apparatus for a display device, comprising the fluorescent tube according to claim 1.

3. A display device characterized by comprising:
    the illuminating apparatus for a display device according to claim 2; and
    a display panel for providing display by using light from the illuminating apparatus for a display device.

4. The display device according to claim 3, wherein the display panel is a liquid crystal panel using a liquid crystal.

* * * * *